Oct. 9, 1962     P. JEAN-BAPTISTE ASTIER     3,057,458
COMPOSING MACHINE AUTOMATIC CONTROL
Filed April 10, 1961                                    8 Sheets-Sheet 3

Inventor:
Pierre Jean-Baptiste Astier
By Karl W. Flocks
Attorney

Inventor:
Pierre Jean-Baptiste Astier
By Karl W. Flocks
Attorney

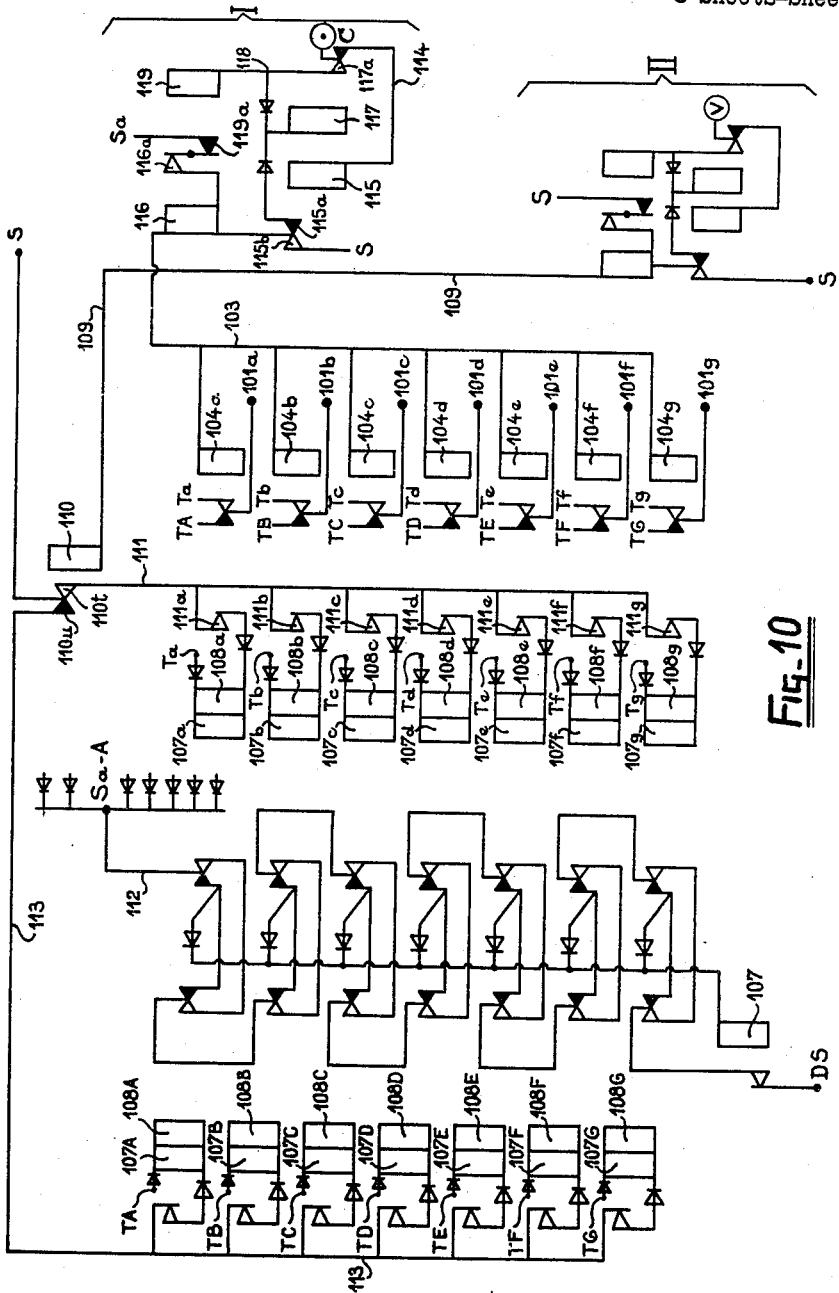

United States Patent Office 3,057,458
Patented Oct. 9, 1962

3,057,458
COMPOSING MACHINE AUTOMATIC CONTROL
Pierre Jean-Baptiste Astier, 4 Rue Eugene Jumin,
Paris 19, France
Filed Apr. 10, 1961, Ser. No. 101,722
Claims priority, application France Apr. 11, 1960
8 Claims. (Cl. 199—18)

The present invention relates to improvements in composing machines and, in particular, to the automatic control thereof by means of a perforated tape bearing perforations in accordance with a particular code.

The automatic control according to the invention is based on the principle of electrically controlling the different essential components of a composing machine, of the "Linotype" type for example, after the conversion of a signal, determined by the perforations in the tape, from the binary to the decimal code.

The present invention does not deal with such conversion devices which can be of any known type, but it does deal essentially with certain specific devices enabling: the raising of the assembling elevator to be automatically controlled; the machine to be automatically stopped by any irregularity occurring at the matrix assembler star; the combinations of perforations in the perforated tape to be read off and the tape to be advanced regularly and intermittently (i.e. stepwise); the momentaneous delaying of the reading-off of the tape when the same sign is repeated, the response time of the electric or electronic means being much more rapid than the response time of mechanical means; the tape to be momentarily stopped by mechanical control, due to a device hereinafter called a "timer."

The signal produced as a function of the sign on the tape is amplified and converted from the binary code into the decimal code to supply an electrical signal to the various essential components of the machine by any known means. One circuit fulfilling these functions will be described hereafter by way of example.

The invention also concerns other electrical devices related to the normal operational cycle of the assembling elevator, the alternate use of upper and lower characters, the use of fount-case characters, the automatic whiting-out of a line, etc., being as many operations as are normally carried out on a machine by an operator during composition but which must now be automatically carried out according to the invention.

More specifically: the raising of the assembling elevator is carried out electro-mechanically by operating on the assembling elevator raising lever; irregularities occurring at the matrix assembler star are checked by a device of the so-called "centrifuge-ball" type, which acts to establish or to cut-off an electric current directly connected with a member controlling the stopping of the normal running of the machine; the device for reading-off the combinations works by means of a luminous system together with at least one photo-electric cell generating a current connected with the various electro-mechanical units which control the particular members to be operated depending on the particular combination or sign to be reproduced; the tape-advancing device is a conventional device controlled by electro-mechanical means; the device for introducing a delay on the repetition of a combination is constructed of at least two columns of relays which correspond to one another and which only supply a current for holding up the advance of the type when the signals corresponding to one combination are reproduced in the two columns simultaneously; the so-called "timer" device is comprised by a series of staged relays energized by periodic pulses from an external source of current; this timer device acts in conjunction with the aforesaid delay device on the one hand and the electro-mechanical device controlling the advance of the tape on the other hand, as well as with the whole of the electrical circuitry controlled by the so-called "scan" currents, that is to say, with the so-called decoding network (conversion from the binary system to the decimal system); lastly, the various devices which control the normal operation of the assembling elevator as well as those for the conventional operation of a composing machine, such as upper and lower and different sorts of characters as well as line whiting-out, are comprised by relay stages which are successively energized to enable the operations to be carried out according to a preset sequence.

The advantages and the features of the invention will be better understood from the following description, given in connection with the accompanying drawings, in which:

FIGURE 10 is a view of the electrical unit enabling the advance of the tape to be delayed following the reproduction of the same combination;

FIGURE 11 is a detail of an electrical unit for controlling the various electrical circuits; and, FIGURES 12, 13 and 14 illustrate the other electrical diagrams for enabling the various operations of a composing machine to be carried out according to the invention.

Figure 1:
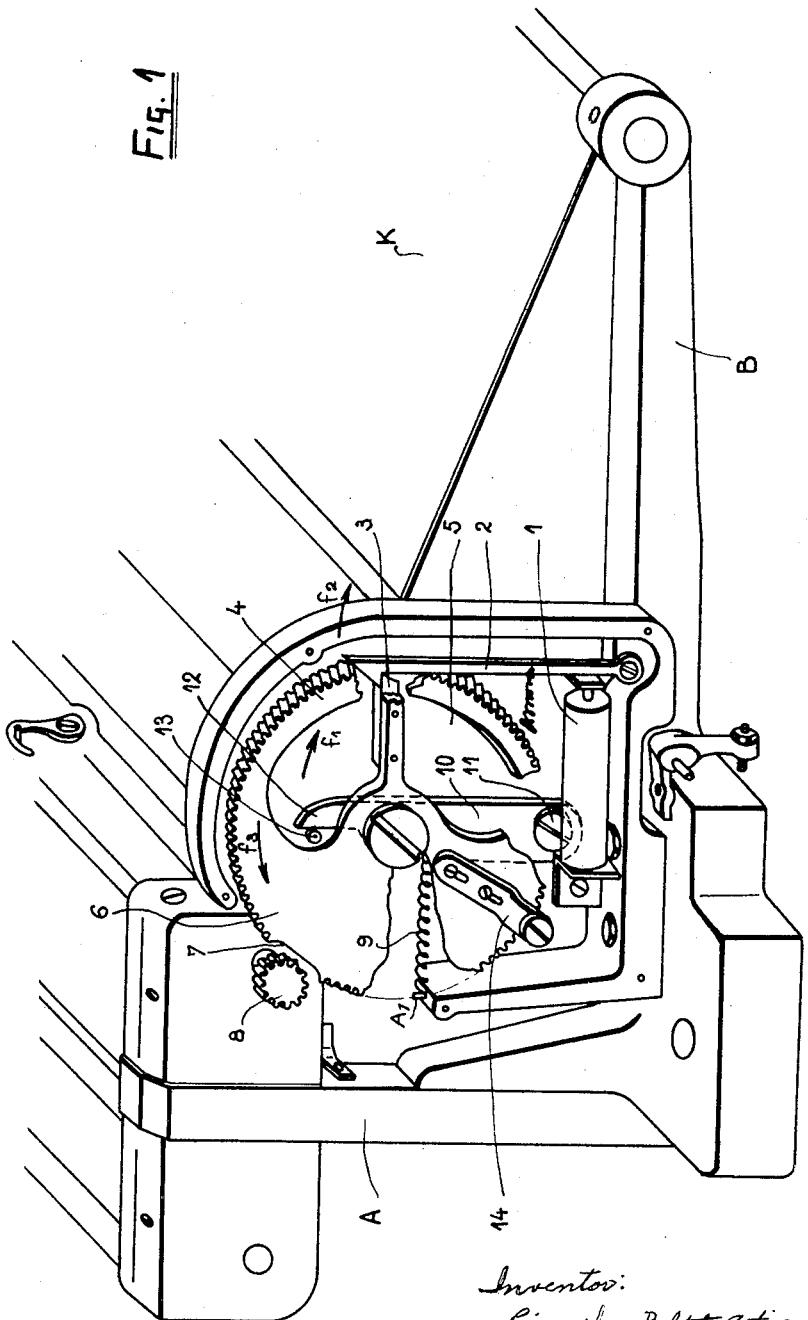
FIGURE 1 is a diagrammatic view of the mechanical unit used to control the raising of the assembling elevator.
Figure 2:
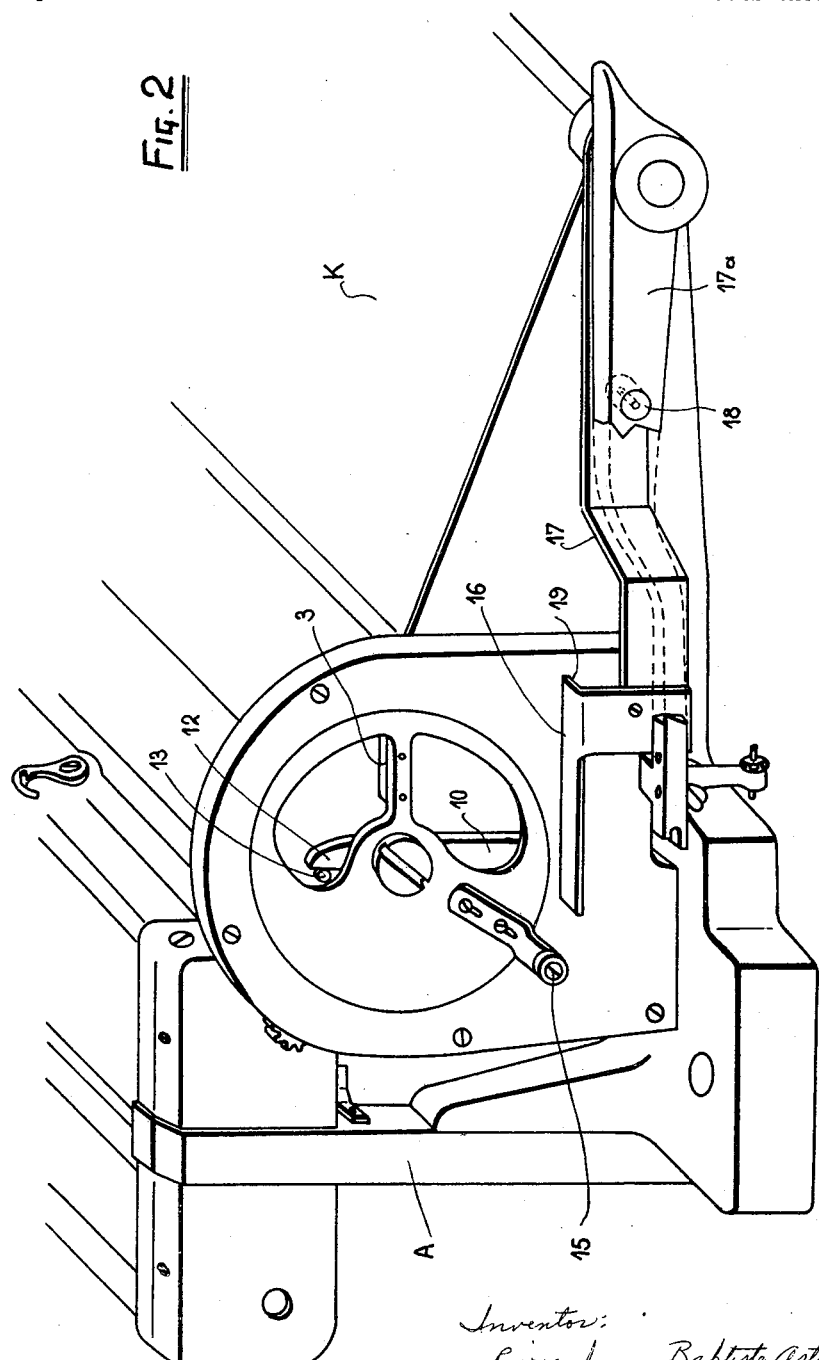
FIGURE 2 is a similar view showing further mechanical details which do not appear in FIGURE 1.

Referring firstly to FIGURES 1 and 2, a portion of the frame already existing in a "Linotype" machine is identified generally by the reference A, while the supporting framework of the keyboard K of this "Linotype" machine is identified generally by the reference B, on which frame is mounted the usual control system for the assembling elevator (not shown).

According to the invention, this control must be entirely automatic without any intervention, on the part of the operator. To this end, the assembling elevator raising device is actuated by means of an electrical signal referred to as the "end-of-line" signal; this signal corresponds to a particular combination on the perforated tape in accordance with a given code (see, for example, FIGURE 9).

According to an advantageous embodiment illustrated in FIGURES 1 and 2, the "end-of-line" electrical signal energizes an electro-magnet 1 which acts on a retaining device 2 of the pawl type, engaging a pin 3 provided on a gear wheel 4, scooped out at 5 and ballasted at 6. This gear wheel 4 includes a toothless sector 7 which, when in the rest position, is in correspondence with a gear wheel 8 driven in rotation by the driving roller for the keyboard cams (such a roller being known and not shown in the drawings). The relative positions of the gear wheels 4 and 8 is such that when gear wheel 4 is rotated its teeth engage with those of gear wheel 8. However, in order to preclude any risk of seizure and engagement of two gear-teeth by their distal extremities, there is provided a resilient system acting on gear wheel 4, this system being comprised, for example, by a spring 9 secured at one of its ends to a point $A_1$ on the framework and at its other end to a member 10 pivotally mounted at 11. This member 10 carries the gear wheel 4 and its upper extremity 12 can abut, under the bias of spring 9, a pin 13 provided on the framework. The relative displacement of the gear wheel 4 to the gear wheel 8 is thus only possible in the direction shown by the arrow $f_1$.

Moreover, gear wheel 4 is provided with a crank-pin 14 carrying a roller 15 capable of acting on a ramp 16 solidly attached to a lever 17, which is in turn solidly attached by a safety device of the clutch or ball-ratchet type (not shown), for example at 18, to the lever 17a controlling the raising of the assembling elevator which is already provided on the machine, which lever 17a is normally operated by hand.

It will immediately be appreciated that when the electro-magnet 1 acts on the device 2, causing this latter to pivot in the direction of arrow $f_2$, the gear wheel 4 is released and under the weight of its ballasted portion 6, this gear wheel rotates in the direction of the arrow $f_3$, to resiliently engage, due to spring 9, the gear wheel 8, which then drives it with a continuous motion until roller 15 has acted on the ramp 16 and the gear wheel 4 has turned through one complete revolution. The roller 15 engages the ramp along the lower face 19 thereof and thus lifts it together with the assembling elevator raising lever. The particular movement of this assembling elevator and its function are not part of the present invention and are well known to those skilled in the art.

During a general composing cycle, mechanical irregularities or faults can occur, such as, for example, jamming of the matrix assembler star.

Since the present invention relates to machines automatically controlled by means of perforated tapes, it is necessary that, when such incidents occur, the perforated tape no longer causes other matrices to fall. It is, therefore imperative that when the matrix assembler star stops, this member being one known to all those skilled in the art, the machine stops operating as a result.

Figure 3:
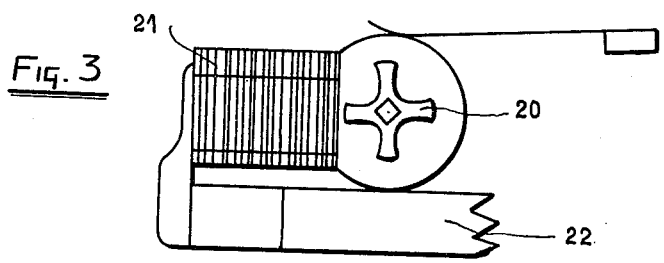
FIGURE 3 is a diagrammatic view of the device acting in combination with the matrix assembler star.
Figure 4:
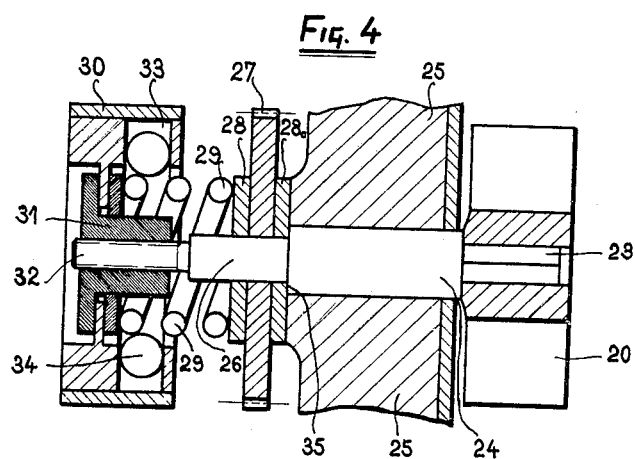
FIGURE 4 is a sectional elevation of the device cooperating with said matrix assembler star.
Figure 5:
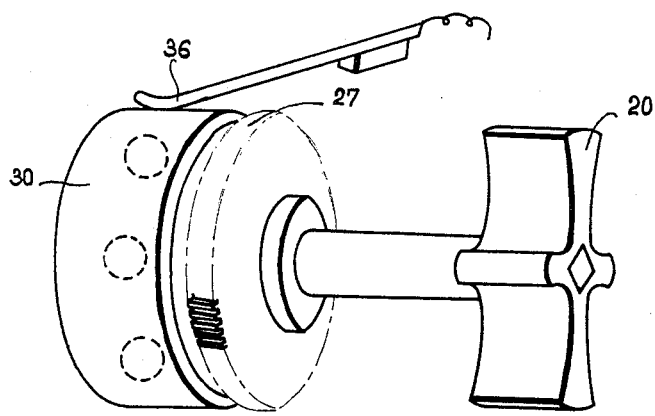
FIGURE 5 is a perspective view of the device shown in FIGURE 4.

To this end the present invention provides a device adapted for this operation which is shown in FIGURES 3 to 5. The assembler star 20 for the matrices 21 (22 being the assembling slider) is a part of the following device, according to the invention, illustrated in detail in FIGURES 4 and 5. This star is mounted on a composite shaft comprising, for example, several different sections sequentially. The first may be a square stub-shaft section 23 which forms an extension of a normal shaft section 24 journalled in bearings 25. This shaft section 24 is itself extended by a shaft section 26 of smaller diameter. On shaft section 26 there is freely mounted a pinion 27 cooperating with two friction-discs 28—28a, a spring 29 bearing against the disc 28 on the one hand, and against insulating material 31 contained within a conductive casing 30 on the other hand. The material 31 also surrounds the extension 32 of shaft 26.

The casing 30 is formed of an electrically conductive metal and contains housings such as 33 for balls such as 34, the purpose of which will be explained hereafter.

Pinion 27 is rotated by a driving member of the "Linotype" machine and, due to the provision of discs 28, 28a and of the shoulder 35 formed on the shaft 24, as well as the action of spring 29 on the disc 28, the shaft 24 is rotated and drives the assembler star 20 therewith. The casing 30 is also rotated; under the action of the centrifugal force, the balls 34 are thrown against the peripheral walls of casing 30. Thus, by virtue of the provision of member 31, the entire unit is electrically interinsulated. However, if for any reason the assembler star 20 is prevented from rotating, the casing 30 no longer rotates either, only the pinion 27 being able to continue its rotation against the opposition of disc 28 and spring 29. As the casing 30 no longer rotates, the balls 34 at the upper outer region fall back towards the center of the former and bear, for example, against spring 29. Contact is thus established between the internal conductive parts of the entire device, i.e., between the shafts and the conductive parts of the casing through the balls 34. A current can therefore flow between the casing and any external electrical circuit, for example through a sliding contact or brush such as 36.

Figure 7:
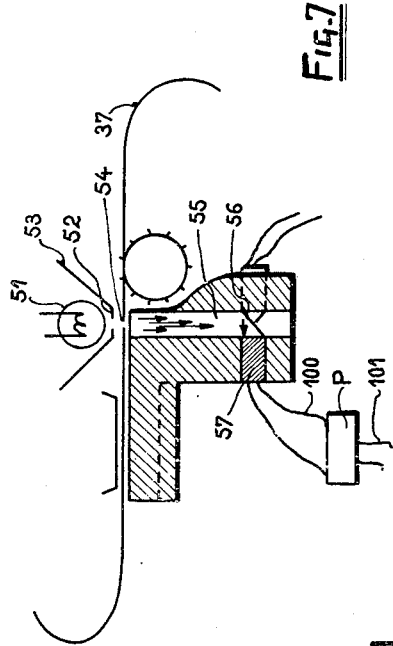
FIGURE 7 is a diagrammatic view of the device enabling the so-called "scan" current to be obtained.
Figure 8:
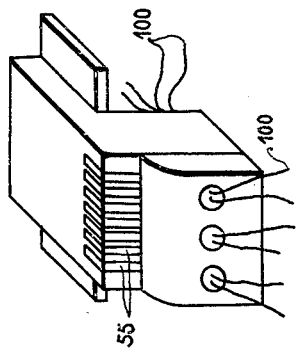
FIGURE 8 is a perspective view of this device.
Figure 6:
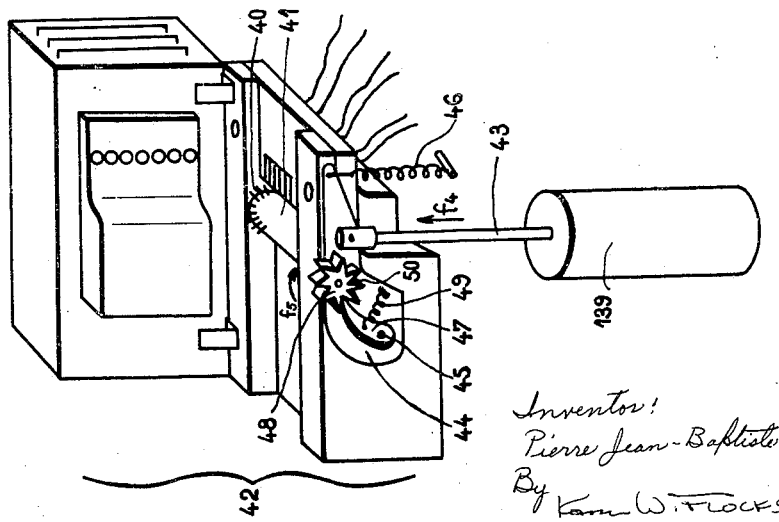
FIGURE 6 is a diagrammatic view of the electro-mechanical device for controlling the advance of the tape.

As for the so-called tape-reading device, this is illustrated in FIGURES 6 to 8, which also show the tape-advancing device.

Figure 9:
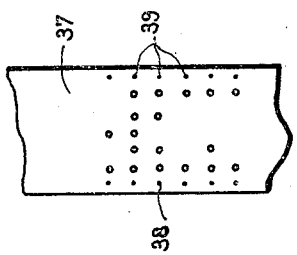
FIGURE 9 is a view of a tape perforated in accordance with a perforation code.

The tape 37, such as is shown in FIGURE 9, is controlled in its movement of translation by virtue of its feed perforations 38 and 39, which cooperate with the sprockets 40 of a cylinder 41. These perforations 38 and 39 have been shown arranged along the sides for reasons of clarity, it being of course understood that the drive could equally be by means of sprockets located in the middle of the cylinder and cooperating with central perforations in the tape.

This cylinder 41 is mounted in a casing shown generally as reference 42. Control of this cylinder 41 can be effected by any suitable means, such as for example the means described hereunder.

The tape should be advanced in a stepwise fashion. To this end, the rod 43 of the plunger of an electromagnet 139, the control of which will be described hereafter, is adapted to actuate a part 44 mounted to pivot against the bias of a spring 46. A pawl 47 is pivotally mounted at 45 on part 44 and engages the teeth of a ratchet wheel 48 mounted at the end of cylinder 41. The pawl 47 is biased against the wheel 48 by the spring 49.

It will immediately be appreciated that when the rod 43 is sent upwards when the electro-magnet 139 is energized, the part 44 is pivoted in the direction indicated tangentially by the arrow $f_4$; the pawl 47 slips off the tooth with which it was engaged to engage with the next tooth, such as 50. It is only when the rod 43 is sent downwards and the part 44 returns under the bias of spring 46 to its initial position that the ratchet wheel 48 rotates through a fraction of a revolution, under the action of pawl 47, in the direction shown by arrow $f_5$. This rotation is accompanied by a corresponding rotation of the cylinder 41 which causes the tape to be advanced, to present the next combination to the read-off device, the embodiment of which is diagrammatically shown in FIGURES 7 and 8.

Each combination is represented by one or more perforations in the tape 37, as shown in FIGURE 9 reading horizontally.

Referring to FIGURE 7, the read-off device proper comprises at least one light source such as 51, the rays from which can either pass through a plate having a number of orifices or apertures corresponding to the particular code used for the perforating of the tape, or act directly on a photo-sensitive device. One aperture of the plate or screen 53 has been shown as 52.

When the light rays from the source 51 are in alignment with a perforation such as 54 of the tape 37, they pass through an optical device 55 such as a prism having a reflecting surface 56 which reflects the light rays into a device such as 57 of the photoelectric-cell type in order to generate a current 100, which will be mentioned later, and which is subsequently amplified by an amplifier P to supply an amplified scan current 101.

According to an advantageous embodiment the optical devices, such as 55, can be designed to reflect the light rays either to one side or to the other of the unit illustrated in FIGURE 7.

Thus, for a seven-hole code, there can be three outlets for the current 100 at the left of the device and four outlets at the right.

This particular arrangement has been selected purely for simplicity of construction of the apparatus, but it will be understood that the latter can also be designed with the outlets for current 100 all located on the same side.

The present invention further provides a device enabling two identical signs following each other in sequence and which are identified on the perforated tape by the same combination to be very clearly distinguished. It is known that a very high rate of sign reproduction is being sought. If this reproduction is effected by means of electrical signals it becomes almost instantaneous, but such is not the case with the mechanical control of the keys and matrices. In fact the speed of the lowering of the matrices is essentially limited by inertial and gravitational phenomena.

A matrix descent speed can be attained which is very acceptable in spite of the inertia as long as it is a question of matrices which are different from one another so they can be lowered almost simultaneously. On the other hand, when a second matrix has to follow immediately upon a first matrix of the same character, the completion of the cycle of the keyboard cam corresponding to this matrix must be awaited.

It is therefore necessary to allow for a momentaneous stopping of the perforated tape when the second sign is presented beneath the read-off head so that the matrix corresponding to this second sign can be released normally. For this purpose the invention provides an electrical device to momentarily stop the reading off of the tape.

This electrical device is shown in FIGURE 10.

The principle on which the electrical diagram of FIGURE 10 is based is as follows: Each sign of the perforated tape is memorized until the reading off of the sign immediately following. The diagram is so designed that when this following sign happens to correspond to the signal memorized it controls a special device which operates directly on the control of the tape advance. It is therefore clear to see that when a sign is not repeated the tape continues to advance in its normal way and at its preset speed.

The electrical diagram under consideration essentially comprises a plurality of judiciously located relays which are successively and alternately energized, as will be seen hereafter. This diagram essentially includes two main circuits capable of acting on each other and being of a homologous type.

Generally speaking, the operation of the unit can be summed up diagrammatically as follows:

Time I: Operation of the tape-advance mechanism;
Time II: Reading off of the code;
Time III: Actuation of the keyboard keys, or "working" time;
Time IV: Successive cutting-off of the so-called "working" current and of the so-called "scan" current.

It has already been seen that each perforation on the tape generates a current 100. This current is amplified by means of an amplifier P at the outlet from which a current 101 is drawn. This current 101 will energize, in accordance with the combination read off, one or more of the circuits 101a to 101g (c.f. FIGURE 10). Assuming, for example, that the combination read off in the first place gives signals at 101a, 101b, 101e.

At the first read-off a current is generated in line 103, as will be seen here-after, which current energizes the relays 104a, 104b, 104c, 104d, . . . 104g.

The currents from the group 101a, 101b, and 101e (the corresponding relays 104 being energized due to the current 103) are fed to the group Ta, Tb, and Te where they energize the relays 107a—108a; 107b—108b; and 107e—108e.

Still at the first read-off and at the time for the "working" current, a current is established in line 109 which energizes the relay 110, causing a current from S to flow (contact 110t being closed) into line 111 as a "holding" current to self-energize, through the closed contacts 111a, 111b and 111e, the corresponding relays 107a — 108a; 107b—108b; 107e—108e, which were previously energized by the "scan" currents.

Of course, the current in 109 can only be established after the current in 103, as the working time is subsequent to the read-off time.

The first read-off and working cycle being thus concluded, the relays involved are finally "memorized"; these are: 107a—108a; 107b—108b; 107e—108e, which correspond to the first combination at the first read-off.

Let us now suppose that, with the tape being advanced, the same combination appears again immediately following; the situation will then be:

*Read-off of the next combination.*—As will be seen hereafter, no current flows in line 103; it follows that the corresponding relays 104a, 104b, 104c . . . 104g, are no longer energized. On the other hand when currents arrive at lines 101a, 101b, and 101e, they are fed to TA, TB and TE and will energize the relays 107A—108A; 107B—108B; and 107E—108E.

Since the relays 107a—108a; 107b—108b; and 107e—108e are still energized by the "holding" current from S examination of the positions of the blades of the corresponding relays shows that a current from Sa—A, supplied by any current in 101, can flow directly into the line 112 to the point DS, the relay 107 also being energized.

If the combination a, b, e had not been repeated, it would not have been possible to cause the current to flow towards DS because any other combination, as will be seen from examination of the drawing, results in meeting an open contact in the series of contacts through which the lines 112 passes to the point DS.

At the "working" time, the current in 109 is cut off, which deenergizes the relay 110. The contact 110t opens while the contact 110u closes. The "holding" current from S no longer flows into line 111 and the relays 107a—108a; 107b—108b; and 107e—108e are deenergized. On the other hand, this "holding" current from S flows into the line 113 causing the relays of stages A, B and E to be self-energized. Of course, the current or signal which has previously been transmitted to DS has now cut-off. It will be seen that this device now holds in memory a combination A, B and E, which, if it should reoccur immediately afterwards on the next read-off would cause the same sequence to be repeated with respect to the corresponding stages a, b, c of the homologous circuit.

Should a "blank" occur on the tape (no perforations) or the maximum number of perforations (neutral sign) no current can reach DS from Sa—A, since in the first case no signal is fed from Sa—A and in the second case the relay 107 is not energized.

A "timer" device, which will be described hereafter, is so designed that a current appears at C at each read-off. The same occurs at each "working" giving rise to a current at V.

The units I and II of FIGURE 10 can be considered in a way as being channeling switches in that for each pulse at C or V, a current is established in the line 103 if there was no such current before, or if such current was already flowing it will be cut-off and vice versa for the line 109.

The units I and II are of identical design, and accordingly only one of them, I, will be described. Let us assume that a current appears at C at a given moment. It can flow through the line 114 to energize the relay 115. The energization of the relay 115 opens the contact 115a and closes the contact 115b, allowing any current from S to flow into the line 103. This current in the line 103 energizes the relay 116 which closes the contact 116a, and the relay 116 is thus self-energized by the current from Sa. When the pulse at C is discontinued, the relay 115 is deenergized and the contact 115a returns to its closed position.

Relay 116 being self-energized, the current from Sa flows through 115a to energize the relay 117, closing the contact 117a, whereby, on the arrival of a new pulse at C, the current from C will flow through the contact 117a into the line 118 to energize the relay 119 which will cut the corresponding contact 119a, and, consequently, deenergize the relay 116 and cut-off the supply to the line 103 as this line can no longer be fed by a current from S, the contact 115b being in the open position by virtue of the deenergized state of relay 115.

From the foregoing it will accordingly be seen that at each pulse received at C, the current in 103 is either cut-off or re-established in alternation.

The same reasoning can be applied to the unit II.

As regards FIGURE 11, this illustrates a simple circuit diagram enabling all pertinent electrical supplies to be cut-off on the occurrence of every "end-of-line" sign. The "end-of-line" signal establishes a current at F which energizes the relay 120 to open the corresponding contact 120a, and the supply from S stops in all of the corresponding circuits. When the end-of-line signal is discontinued, the relay 120 is deenergized, the contact 120a closes and current can flow once again from S.

Figure 12:
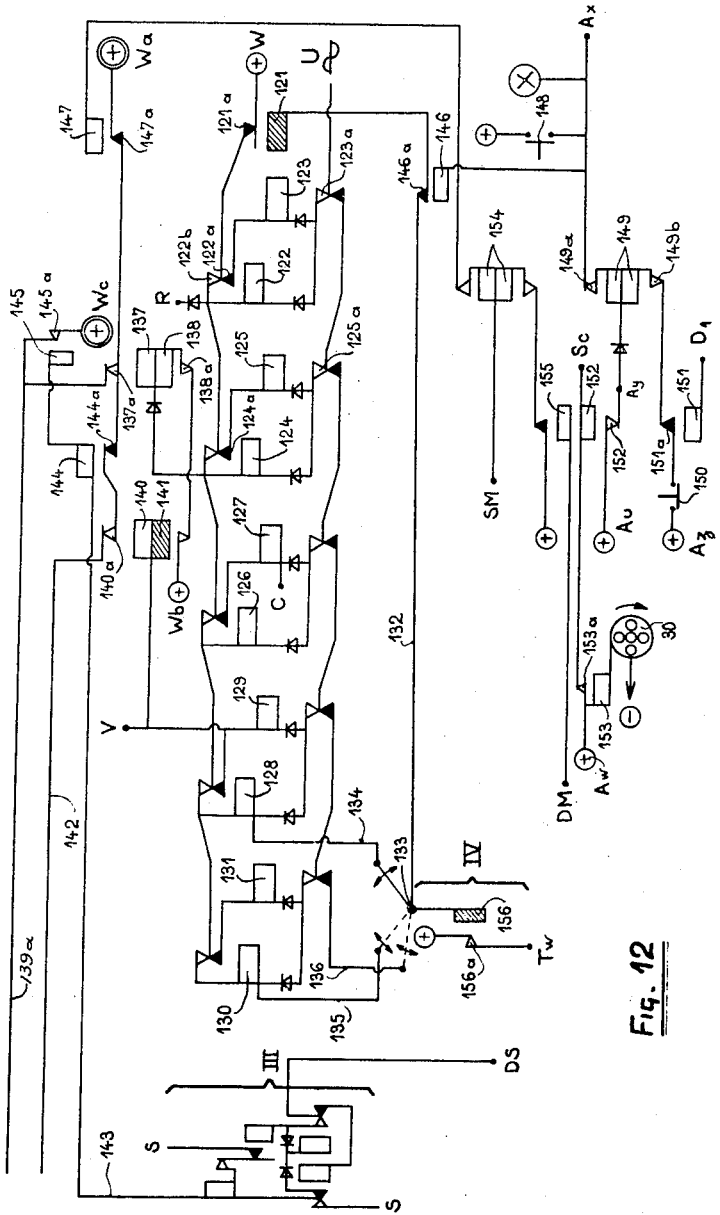

In FIGURE 12 is shown the circuit diagram corresponding to the so-called "timer" device, the purpose of which is to determine the four earlier-mentioned time periods which are required at the read-off of a given combination.

This "timer" device essentially comprises stages of relays which are successively affected, each of these stages corresponding to a time period necessary in the cycle after read-off of any given combination. This device is controlled either by an A.C. current or a train of pulses of constant or predetermined recurrence frequency.

This device cooperates with one of the devices controlling the momentary stopping of the advance of the perforated tape.

It is supplied from a source of current W, which current, supposing the device to be at its initial state, flows through the contacts 121a, 122a to energize the relay 123 which closes the contact 123a. The first stage of the device under consideration is then ready to receive a pulse from the pulsating source U. A pulse from U (corresponding to the positive half of an A.C. wave) can pass through the closed contact 123a to energize the relay 122 and affect the line R whose purpose will be explained hereafter. The relay 122 being energized, the contact 122b closes and the current W can then continue to flow through 124a to energize the relay 125, while self-energizing the relay 122. The relay 125 being energized, the contact 125a closes and the new stage is ready to receive a further pulse from U. This pulse will result in energizing the relay 124. As before, this relay 124 can be self-energized by virtue of the current from W and the same phenomenon occurs successively in all the other stages in a similar manner. To each stage affected there corresponds one of the time periods which was mentioned earlier on. Thus, the stage corresponding to relays 122—123 defines the first time period or "action" time for the tape-advance mechanism; the stage corresponding to relays 124—125 defines the second time period or "read-off" time; the stages corresponding to relays 126—127 and 128—129, define, respectively, the "working" time and both the cutting-off of the "working" time and the cutting-off of the "read-off" time. The stage corresponding to relays 130—131 is an additional stage enabling, if desired, the duration of the "read-off" time to be extended. Normally, in the simplest read-off cycle, the current from 128 passes directly into the line 132, contact 133 being connected directly to the outlet line 134 from relay 128. It will immediately be appreciated that if current flows into the line 132, the relay 121 will be energized, thus cutting off the supply from W, and the device is returned to its initial or starting state. If the contact 133 is connected to the line 135, the latter corresponds to the output from the higher stage (outlet from relay 130), which enables the device to be returned to its starting state after a longer period of time. The same is true if the contact 133 is connected directly to line 136, i.e. the device returns to its starting state after an even longer period of time.

The output current from relay 124, corresponding to the read-off stage, energizes, when this stage is affected by a pulse from U, the two relays 137 and 138. The energization of relay 137 closes the contact 137a and the energization of relay 138 closes the contact 138a. If 137a is closed, it allows a current from Wa to supply the electro-magnet 139, which will be referred to as the "trigger" electro-magnet of tape-advance device, through the line 139a. As for the closed contact 138a, this enables the relays 137 and 138 to be self-energized, if the current from Wb is allowed to flow. This is possible when the relay 129 of the first upper stage is energized. The pulse responsible for the energization of this relay 129 from U results in the current V, to which reference has been made in connection with the explanation of FIGURE 10. This current V also supplies relays 140 and 141. Relay 140 closes the contact 140a, allowing the line 142 to be supplied by Wa, said line feeding, through the so-called "decoder" device, the group of electro-magnets controlling the various essential members required for the normal operation of a "Linotype" machine, and notably the electro-magnets controlling the counter-weights of the keyboard keys, etc. This particular control of the keyboard keys has not been illustrated in the drawings.

As to the relay 141, this is a slower relay than the group of other relays, solely for purposes of safety.

It has been seen in connection with the description of FIGURE 10, that upon repetition of the same combination, a current could be established in DS. This current is again indicated in FIGURE 12. When established, it affects the switching device III whose operation is similar to that of the previously described switching devices I and II, and whose role is to establish a current in line 143 if there is no current already in this line, or to cut it off if there is current in this line previously established from S following pulses received from DS.

Should a known combination be immediately repeated, we have previously seen that a pulse will be received at DS. Since the line 143 was not initially fed from S, this pulse establishes current at 143 through S, thus energizing relays 144 and 145. The relay 144 opens the contact 144a thus precluding any possibility of supply from Wa to the so-called "working" line 142. Moreover, the energization of relay 145 closes the contact 145a and holds the tape-advance device in its "armed" position, as in the former case, due to the energization of the electro-magnet 139 from the current source Wc.

It is to be noted at once that the appearance of this current in 143 causes both the advance of the tape to be stopped, and any effective working of the "Linotype" machine to be prevented, following the cut-off of current in 142. On the other hand, the successive stages which follow the read-off stage continue to operate normally, as has been previously described, for each pulse from U until the cycle ends with line 132 carrying a signal.

Since the tape has not been advanced, the combination presented for read-off will be read-off once more and a further pulse will be fed to DS; this further pulse will cut off the supply 143 and return the whole of the device to its normal working, that is to say that neither the working of the machine nor the advance of the tape will be longer hindered in any way.

The diagram illustrated in FIGURE 12 provides for several devices enabling tape read-off to be stopped either permanently or temporarily. These stoppings can be made either by actuating a relay such as 146, which operates a contact 146a to cut-off the return of the current, or by cutting-off the supply from Wa by actuating the relay 147 and the corresponding contact 147a.

Stopping by means of the relay 146 results in the interruption of the cycle only at the fourth time period, the other phases of the cycle being carried out normally; whereby, when the operation of the machine is resumed, the new cycle will begin from the first time period. On the other hand if relay 147 is used, its effect is to stop the advance of tape and its read-off without stopping the so-called "timer" cycle. This type of tripping can sometimes be useful, as will be explained hereafter.

In order to act on 146, it is merely sufficient to operate a direct contact 148 to allow the current A$x$ to flow to the relay 146. This relay 146 can also be energized by sending a pulse to A$y$, thus energizing the relays 149 which close contacts 149$a$ and 149$b$. With the contact 149$a$ closed, the relay 146 is energized; with the contact 149$b$ closed, the relays 149 are self-energized by the current from A$z$, the contact 150 being closed. To resume working it suffices only to open the contact 150 or to allow current to flow into D1, which current energizes the relay 151 to open the contact 151$a$. It is also possible to act on 146 by allowing a pulse into S$c$ to thus energize the relay 152 which closes the contact 152$a$ to permit passage of the current from A$u$.

It has already been seen above that in the case of accidental stopping of the assembler star the brush 36 enables an electrical circuit to be established. In this way it can cause the relay 153 to be energized to close the contact 153$a$ and allow a current from A$w$ to pass which, in turn, energizes the relay 152, and thereafter the description as for the preceding case applies.

In order to operate the relay 147, it will be easily seen that a current can be fed to SM to energize the corresponding relays 154. To resume working it is merely sufficient to send a pulse to DM so as to energize the relay 155.

As to the unit IV, it will immediately be seen that each pulse flowing through line 132 energizes the relay 156 to close the corresponding contact 156$a$ and send a pulse into the line T$w$.

Figure 13:
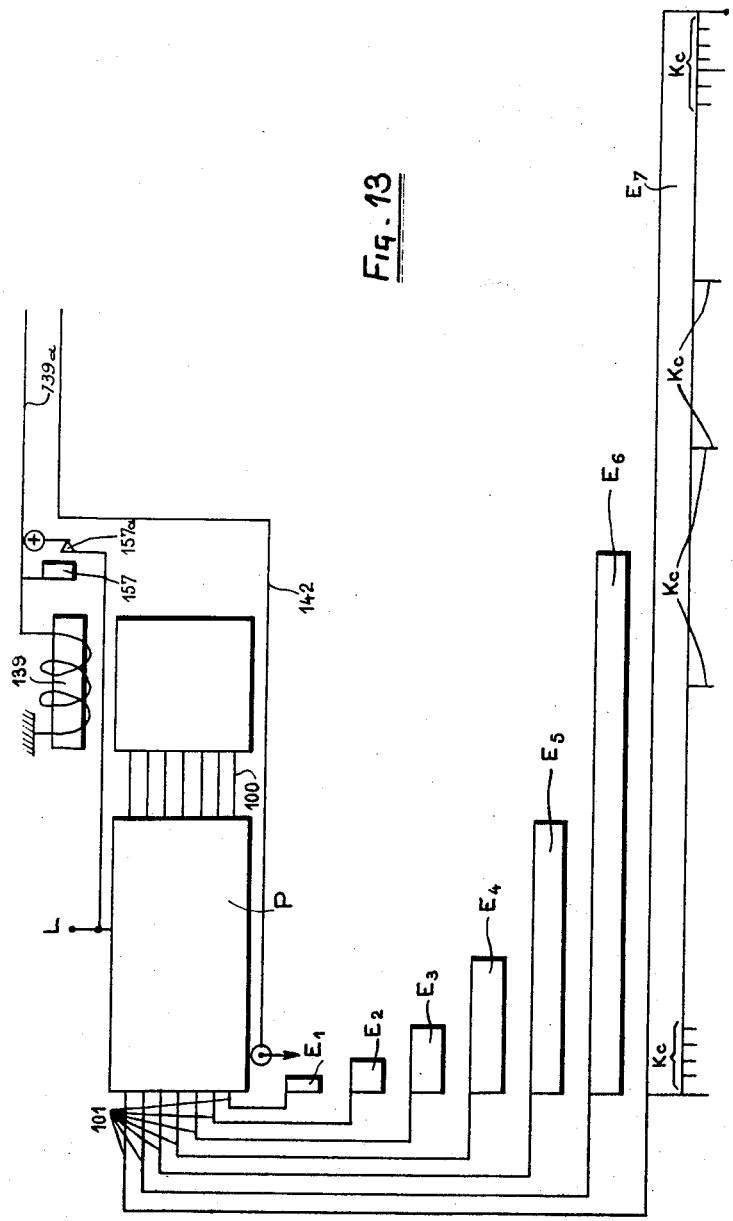

Referring now to FIGURE 13, there is diagrammatically illustrated therein the read-off, amplifying and binary decoding system. Simultaneously with read-off and the energization of the electromagnet of the system adapted to trigger the advance of the tape, the relay 157 is energized to close the contact 157$a$ and allow an amplifying current to flow through the amplifier P. This amplifier P amplifies the current 100 to give the current 101. The amplifier can obviously be of any known type. The current 101 is used to control the so-called decoding network, of known design, which decoding network has been diagrammatically shown in the drawings, the successive stages thereof being designated by the references E1, E2, E3 . . . E7 (corresponding to the seven-hole code preferred in accordance with the invention). The positioning of the contacts of the relays corresponding to one or more stages of this network will then correspond to the read-off time. At a so-called "working" pulse following current in 142, it is then possible to send current into one of the 128 lines which may be at the outlet of stage E7. This current output from the network can act on one of the keys of the keyboard or on any other member of the "Linotype" machine. Some of these lines, identified by references K$c$, have been shown in FIGURE 13.

Figure 14:
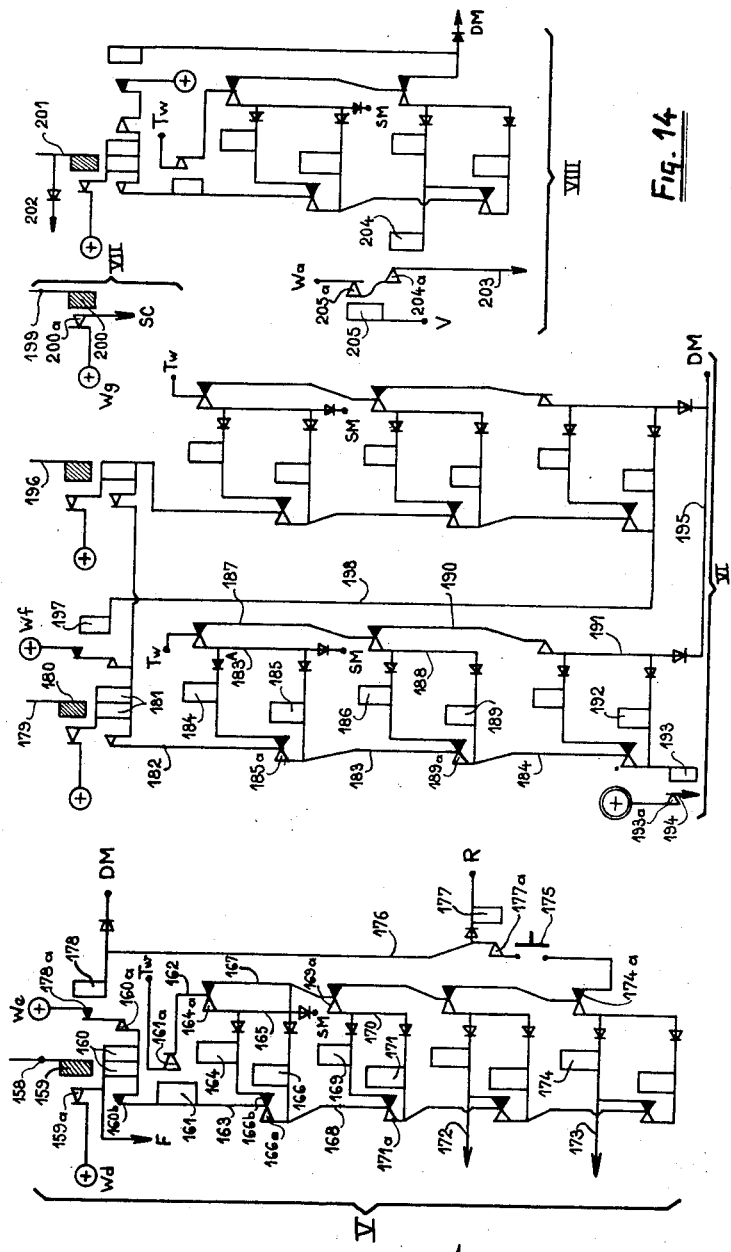

Referring now to FIGURE 14, there is shown a certain number of circuit diagrams which will be described successively. These circuit diagrams consist mainly of "columns" of relays, each of which has a particular part to play. Thus, for example, column V is that corresponding to the raising of the assembling elevator. It is necessary that, on reception of an "end-of-line" signal, the assembling elevator be raised. This is as has previously been described. But it is also necessary that as the assembling elevator is being raised, the tape be stopped until the assembling elevator resumes its initial position. This is precisely what the column V does. Suppose that an "end-of-line" pulse arrives at the outlet of the decoding network, at 158. The relay 159 is energized to close the contact 159$a$ which thus energizes the relays 160 by W$d$, which relays close the contacts 160$a$ and 160$b$. These relays 160 are also selfenergized by the current from W$e$. Moreover, a pulse arrives in the line F from W$d$, the purpose of this line having been disclosed in connection with the description of FIGURE 11, this being the so-called "end-of-line" current.

With contact 160$b$ closed, the current from W$e$ can energize the relay 161 to close the contact 161$a$, thus enabling a pulse from T$w$ to pass into the line 162. The current flowing in the line 163 also energizes the relay 164 to close the contact 164$a$. This enables the current from line 162 to flow into the line 165 for energizing the relay 166 and sending a pulse to SM. This pulse at SM acts on the relay 147 (FIGURE 12) and stops the advance of the tape and the read-off of the combination represented during the entire time for raising and returning the assembling elevator.

When the relay 166 is energized, the contact 166$a$ closes. This results in a so-called "dead" time period corresponding to the fall of the last matrix and to the assembling of the matrices in the assembling elevator. When the pulse at T$w$ is discontinued, the relay 164 is deenergized following the opening of the contact 166$b$, When a new pulse arrives at T$w$, the current can flow into line 167. But since the current from 163 also flows through line 166, the relay 169 is energized and closes the contact 169$a$; the current in 167 can then supply the line 170 to energize the relay 171 and close the contact 171$a$ and so on from one stage to the next in this column V. When, in this column, the current affects line 172 this current energizes an electro-magnet (not shown) which operates the return of the assembling slider 22 for the matrices (see FIGURE 3). When, column V operating and following successive pulses at T$w$, the current affects the line 173, the assembling elevator is raised as has been explained in connection with the description of FIGURES 1 and 2. Since line 173 is no longer affected, the relay 174 is deenergized for the same reasons as those given when describing the earlier stages, and the contact 174$a$ is closed, whereby, when the assembling elevator is returned in the normal way, it can operate a contact 175 and allow a current from T$w$ to flow into the line 176, provided that the contact 177$a$ is closed, i.e. provided that the corresponding relay 177 is energized. These conditions realized the current in the line 176 energizes the relay 178 causing the column V to fall back to its initial state, the current from W$e$ being then cut-off by the closing of the contact 178$a$. This current in 176 further supplies a signal to DM, thus restarting the read-off and tape-advance system at the selected moment and in the manner which has been described above (FIGURE 12).

The relay 177 is only energized if a pulse is fed to R, which pulse is obtained as has previously been described.

As for the column VI, this relates to "upper," "lower," or any other "Duplex" character. When an "upper" character must follow immediately upon a "lower" character, during the automatic controlling of a composing machine by means of perforated tapes, the following time periods must be provided:

Time I: Stopping of the tape;
Time II: "dead" time, which is a period provided to allow the last matrix corresponding to the last lower character to take up its position in the assembling elevator;
Time III: Operation time for the electro-magnet controlling the so-called Duplex rail;
Time IV: which corresponds to the re-starting of the tape-advance and read-off device.

The successive steps are the same when a series of "upper" characters are to be followed by "lower" characters. The following periods must be provided: a momentary stopping of the tape; a dead time so that the last matrix corresponding to the last upper character can take up its position in the assembling elevator; a time corresponding to the operation of the Duplex rail; operation on the tape-advance and read-off mechanism.

These different stages clearly appear from the examination of the electrical unit VI shown in FIGURE 14.

As in the case of unit V, a pulse in the line 179 (which corresponds for instance to a pulse relating to an upper character) energizes the relay 180 to enable the relays 181 to be energized also, and subsequently allow a current to flow in the line 182 from Wf and a pulse to be fed from Tw into the line 183A following the energization of relay 184. This current in 183A acts on SM (stopping of the tape). 183A also energizes the relay 185 to close the contact 185a. The current from 182 can then flow into 183 to energize the relay 186 and, when a further pulse is received from Tw, the current can flow into the lines 187 and 188 to energize the relay 189 which closes the contact 189a. This pulse corresponds to the above-defined "dead" time. A further pulse from Tw permits a current to flow in 187—190—191 to energize the relay 192, which allows the current to flow through 182, 183, 184 to the relay 193, thus closing the contact 193a to energize, for example, an electro-magnet adapted to operate the Duplex rail (not shown) by the line 194 and allow the tape to resume its advance owing to the current flowing through 195 and DM. The electro-magnet which operates the Duplex rail remains energized as long as is necessary for the upper character composition; but should this composition be interrupted by a sign which must be reproduced in lower characters, and with the electro-magnet of the Duplex rail still energized, a signal is fed to 196, and the reasoning which was applied to the left-hand column of the unit VI in FIGURE 14 will hold for its right-hand column, viz:

Time I: SM actuated (momentary stopping of the tape)
Time II: dead time, to allow the last upper character time to take up its position exactly in the assembling elevator
Time III: Operation of relay 197 through line 198, to return the left-hand column to its initial state, translated into deenergization of the Duplex rail electro-magnet.
Time IV: Resumption of tape-advance by means of DM.

The unit VII of FIGURE 14 corresponds to fount-case characters. The pulse concerning these characters arrived by 199, energizes the relay 200 to close the contact 200a and allow a current from Wg to flow into Sc to stop the machine, as has been seen in connection with the description of FIGURE 12. For these special characters those skilled in the art know exactly how to proceed, and the applicant does not intend to describe the technique here.

The unit VIII concerns the so-called space-out or white-out of a line.

For this operation, it is necessary to act on a "space" together with a "thin space" for example; the space is acted upon directly by the corresponding pulse from 201 transmitted to 202. This pulse acts on the relay column in the same manner as in the earlier-described columns to cause firstly the stopping of the tape (SM) and then action on the "thin space" by the current in 203, following energization of the relay 204 which closes the contact 204a to enable the current from Wa to flow when current V is established for energizing the relay 205 to close contact 205a. This column then functions like those preceding, that is to say the current is established after this operation at DM to re-start the advance of the tape and to cause the column to fall back to its initial state.

By similar reasoning, and by providing similar circuits, it is thus possible to design a whole series of others which may be needed by the operator.

It is to be understood that the present invention has only been described by way of explanation and without any intention of limitation, and that any useful modifications of detail can be made therein without falling outside its scope.

I claim:

1. System for the automatic control of the assembling elevator lever and the assembler star of a composing machine of the line-casting type during the assembly of matrices comprising means adapted to feed a tape containing perforations arranged in accordance with a preselected code to said composing machine, means adapted to read-off said perforations, means adapted to produce electrical signals as a function of the arrangements of said perforations in said tape, means adapted to feed said electrical signals to actuating members of said composing machine in a selective manner, said system including first electro-mechanical means adapted to react to a predetermined signal selected from said electrical signals to raise the assembling elevator lever of said composing machine, second electro-mechanical means adapted to co-operate with the assembler star of said composing machine and to stop the functioning of said machine when any irregularity takes place in the assembly of the matrices, first electrical means adapted to introduce a delay into the action of the tape-advance mechanism of said composing machine when two identical arrangements of said perforations occur on said tape sequentially, a timer device adapted to co-operate with said first electrical means, and second electrical means adapted to actuate, in a predetermined manner, ancillary control members of said composing machine.

2. System for the automatic control of the assembling elevator lever and the assembler star of a composing machine of the line-casting type during the assembly of matrices comprising means adapted to feed a tape containing perforations arranged in accordance with a preselected code to said composing machine, means adapted to read-off said perforations, means adapted to produce electrical signals as a function of the arrangements of said perforations in said tape, means adapted to feed said electrical signals to actuating members of said composing machine in a selective manner, said system including first electro-mechanical means adapted to react to a predetermined signal selected from said electrical signals to raise the assembling elevator lever of said composing machine, second electro-mechanical means adapted to cooperate with the assembler star of said composing machine and to stop the functioning of said machine when any irregularity takes places in the assembly of the matrices, first electrical means adapted to introduce a delay into the action of the tape-advance mechanism of said composing machine when two identical arrangements of said perforations occur on said tape sequentially, a timer device adapted to cooperate with said first electrical means, and second electrical means adapted to acuate, in a predetermined manner, ancillary control members of said composing machine, said first electro-mechanical means including an electro-magnet, an electrical control circuit adapted to actuate said electro-magnet, a first gear wheel resiliently mounted and of eccentric loading, a pin mounted on said first gear wheel, a retaining device adapted to engage with said pin and to be actuated by said electro-magnet, a second gear wheel adapted to transmit a drive to said first gear wheel, and cam means connected to said first gear wheel and adapted to actuate the assembling elevator raising lever of said composing machine.

3. System according to claim 2 wherein said electrical control circuit comprises a series of co-operating relay circuits, said series having a plurality of electrical inputs and a plurality of electrical outputs, including a first said input being embodied by a signal corresponding to the normal end-of-line sign used in said composing machine, a second said input being embodied by a first signal from said timer device, a third said input being embodied by a second signal from said timer device, a fourth said input being embodied by a first external source of current, a fifth said input being embodied by a second external source of current, a first said output being fed to a make-and-break circuit adapted to control said first electrical means, a second said output being fed to a control circuit adapted to stop said tape-advance mechanism, a third said output being fed to the control mechanism of the assembling slider of said composing machine, a fourth said output being fed to said electro-magnet of said first electro-mechanical means, and a fifth said output being fed to a control circuit adapted to start up said tape-advance mechanism, a circuit breaker mounted on said fifth said output and connected to said assembling elevator lever, said series of co-operating relay circuits being adapted to apply selected inputs of said plurality of electrical inputs to selected outputs of said plurality of electrical outputs according to a preselected sequence.

4. System for the automatic control of the assembling elevator lever and the assembler star of a composing machine of the line-casting type during the assembly of matrices comprising means adapted to feed a tape containing perforations arranged in accordance with a preselected code to said composing machine, means adapted to read-off said perforations, means adapted to produce electrical signals as a function of the arrangements of said perforations in said tape, means adapted to feed said electrical signals to actuating members of said composing machine in a selective manner, said system including first electro-mechanical means adapted to react to a predetermined signal selected from said electrical signals to raise the assembling elevator lever of said composing machine, second electro-mechanical means adapted to cooperate with the assembler star of said composing machine and to stop the functioning of said machine when any irregularity takes place in the assembly of the matrices, said second electro-mechanical means comprising a composite electrically conductive shaft including a section keyed to the assembler star, a bearing section, a clutch section, and a centrifugal switch-carrying section, clutch means mounted on said clutch section adapted to provide friction drive to said composite shaft, centrifugal switch means mounted on said centrifugal switch-carrying section and comprising an electrically conductive casing surrounding said switch-carrying section, an electrically insulating sleeve bearing secured to both said switch-carrying section and said casing, at least one radially displaceable contact member of electrically conductive material located adjacent said switch-carrying section and adapted to make and break electrical contact between said switch-carrying section and said casing under the action of centrifugal force, and electrical circuitry adapted to provide the external electric circuit between said casing and said composite shaft, said external electric circuit being adapted to control the functioning of said composing machine, and first electrical means adapted to introduce a delay into the action of the tape-advance mechanism of said composing machine when two identical arrangements of said perforations occur on said tape sequentially, a timer device adapted to cooperate with said first electrical means, and second electrical means adapted to actuate, in a predetermined manner, ancillary control members of said composing machine.

5. System for the automatic control of the assembling elevator lever and the assembler star of a composing machine of the line-casting type during the assembly of matrices comprising means adapted to feed a tape containing perforations arranged in accordance with a preselected code to said composing machine; means adapted to read-off said perforations; means adapted to produce electrical signals as a function of the arrangements of said perforations in said tape; means adapted to feed said electrical signals to actuating members of said composing machine in a selective manner; said means adapted to feed said tape including a tape-drive roller containing drive sprockets thereon, an electro-magnet, and a ratchet device mechanically connecting said electro-magnet to said drive roller and said means adapted to read-off said perforations including at least one light source, at least one photo-electric cell, at least one optical device adapted to direct light rays from said source passing through said perforations onto said photoelectric cell; said system including first electromechanical means adapted to react to a predetermined signal selected from said electrical signals to raise the assembling elevator lever of said composing machine; second electro-mechanical means adapted to cooperate with the assembler star of said composing machine and to stop the functioning of said machine when any irregularity takes place in the assembly of the matrices; first electrical means adapted to introduce a delay into the action of the tape-advance mechanism of said composing machine when two identical arrangements of said perforations occur on said tape sequentially; a timer device adapted to cooperate with said first electrical means; and second electrical means adapted to actuate, in a predetermined manner, ancillary control members of said composing machine; said first electrical means comprising a first column of relay circuits, there being as many relay circuits as there are maximum perforations possible according to said preselected perforation code, a second column of relay circuits containing as many relay circuits as there are relay circuits in said first column, and each said relay circuit of said second column corresponding to a selected said relay circuit of said first column, a first source of D.C. current, a first switching circuit adapted to alternately supply current from said first source to each of said first and second columns as a holding current, a column control circuit adapted to feed said electrical signals selectively and alternately to said first and second columns, a second source of D.C. current, a gating circuit controlled by both said first column of relays and said second column of relays and adapted to provide a conductive path for electric current from said second source only when at least one pair of corresponding relay circuits in said first and second columns are energized, a third source of D.C. current, a second switch circuit adapted to supply current from said third source to said column control circuit, and means adapted to electrically connect said gating circuit to said electro-magnet through said timer device.

6. System according to claim 5, wherein said first source and said third source of current are one and the same source provided by a make-and-break circuit adapted to be controlled by the predetermined electrical signal of said electrical signals corresponding to the normal end-of-line sign used in said composing machine.

7. System according to claim 5, wherein said timer device comprises a series of delay circuits having a plurality of interdependent inputs and a plurality of independent outputs, said interdependent inputs being constituted by at least one continuous current source and at least one pulsating current source, the first of said independent outputs being fed to a first electrical circuit adapted to control the assembling elevator raising lever of said composing machine, the second of said independent outputs being fed to a second electrical circuit adapted to control those functions of said composing machine normally controlled by the keys of the keyboard of said composing machine as well as said tape-advance mechanism, the third of said independent outputs being fed to a third electrical circuit including said first switching circuit of said first electrical means, the fourth of said independent outputs being fed to a fourth electrical circuit adapted to cut off said at least one continuous current source, a third switch circuit supplied by the output of said gating circuit and adapted to co-operate with said second electrical circuit to make and break the supply to said tape-advance mechanism as well as the supply to those functions of said composing machine normally controlled by the keys of the keyboard of said composing machine.

8. System for the automatic control of the assembling elevator lever and the assembler star of a composing machine of the line-casting type during the assembly of matrices comprising means adapted to feed a tape containing perforations arranged in accordance with a preselected code to said composing machine, means adapted to read-off said perforations, means adapted to produce electrical signals as a function of the arrangements of said perforations in said tape, means adapted to feed said electrical signals to actuating members of said composing machine in a selective manner, said system including first electro-mechanical means adapted to react to a predetermined signal selected from said electrical signals to raise the assembling elevator lever of said composing machine, second electro-mechanical means adapted to cooperate with the assembler star of said composing machine and to stop the functioning of said machine when any irregularity takes place in the assembly of the matrices, first electrical means adapted to introduce a delay into the action of the tape-advance mechanism of said composing machine when two identical arrangements of said perforations occur on said tape sequentially, a timer device adapted to cooperate with said first electrical means, and second electrical means adapted to actuate, in a predetermined manner, ancillary control members of said composing machine, said second electrical means comprising a plurality of auxiliary control circuits, each of said auxiliary circuits being adapted to stop said tape-advance mechanism for a period of time determined as a function of the time necessary to clear the composing machine of the control actuating said auxiliary circuit.

References Cited in the file of this patent

UNITED STATES PATENTS

| | | |
|---|---|---|
| 2,073,115 | Mellinger et al. | Mar. 9, 1937 |
| 2,869,717 | Rossetto et al. | Jan. 20, 1959 |